US012683063B2

(12) United States Patent
Liu et al.

(10) Patent No.: US 12,683,063 B2
(45) Date of Patent: Jul. 14, 2026

(54) INDUCTOR DEVICE

(71) Applicant: DELTA ELECTRONICS, INC., Taoyuan City (TW)

(72) Inventors: Chia-Ming Liu, Taoyuan City (TW); Ruei-Wun Jhong, Taoyuan City (TW); Ho Huang, Taoyuan City (TW); Lei Ren, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 736 days.

(21) Appl. No.: 17/933,859

(22) Filed: Sep. 21, 2022

(65) Prior Publication Data

US 2023/0386730 A1 Nov. 30, 2023

(30) Foreign Application Priority Data

May 24, 2022 (CN) ......................... 202210574752.3

(51) Int. Cl.
*H01F 27/28* (2006.01)
*H01F 27/24* (2006.01)

(52) U.S. Cl.
CPC ......... *H01F 27/2828* (2013.01); *H01F 27/24* (2013.01)

(58) Field of Classification Search
CPC ................. H01F 27/2828; H01F 27/24; H01F 2027/2814; H01F 27/2847; H01F 27/2895; H01F 27/303; H01F 27/306; H01F 27/28; H01F 27/2852; H01F 17/06; H01F 17/062
See application file for complete search history.

(56) References Cited

U.S. PATENT DOCUMENTS

| | | | | | |
|---|---|---|---|---|---|
| 4,103,267 | A * | 7/1978 | Olschewski | H05K 1/165 | 336/200 |
| 4,536,733 | A * | 8/1985 | Shelly | H05K 1/165 | 336/200 |
| 4,777,465 | A * | 10/1988 | Meinel | H01L 23/642 | 336/200 |
| 4,975,671 | A * | 12/1990 | Dirks | H01F 17/0033 | 336/200 |

(Continued)

FOREIGN PATENT DOCUMENTS

| | | |
|---|---|---|
| CN | 101116237 A | 1/2008 |
| CN | 104575998 A | 4/2015 |

(Continued)

*Primary Examiner* — Mang Tin Bik Lian
(74) *Attorney, Agent, or Firm* — CKC & Partners Co., LLC

(57) ABSTRACT

An inductor device includes a hollow magnetic core and at least one winding assembly. The winding assembly includes a plurality of conductive structures and U-shaped conductors, and the conductive structures are below the hollow magnetic core. The conductive structures are arranged along a segment of the hollow magnetic core, and the U-shaped conductors are across the hollow magnetic core and arranged along the segment of the hollow magnetic core. Two ends of at least one of the U-shaped conductor are respectively in contact with two of the conductive structures such that the U-shaped conductors and the conductive structures are electrically connected to each other and collectively continuously surround the segment of the hollow magnetic core.

6 Claims, 15 Drawing Sheets

(56) References Cited

U.S. PATENT DOCUMENTS

| | | | | |
|---|---|---|---|---|
| 5,425,166 | A * | 6/1995 | Hastings | H01F 1/0027 336/200 |
| 7,498,921 | B1 * | 3/2009 | Wang | H01F 27/2852 336/200 |
| 2003/0025585 | A1 * | 2/2003 | Macerini | H01F 27/2804 29/606 |
| 2006/0163970 | A1 | 7/2006 | Caddell | |
| 2009/0160596 | A1 * | 6/2009 | Yang | H01F 27/2895 336/208 |
| 2011/0001590 | A1 * | 1/2011 | Wu | H05K 1/0233 29/829 |
| 2012/0146755 | A1 * | 6/2012 | Shao | H01F 17/062 336/182 |
| 2014/0232502 | A1 * | 8/2014 | Gutierrez | H01F 27/2895 336/200 |
| 2019/0311845 | A1 * | 10/2019 | Imanishi | H01F 17/06 |
| 2019/0333674 | A1 * | 10/2019 | Quilici | H05K 3/4611 |
| 2020/0111599 | A1 | 4/2020 | Xu | |
| 2022/0028604 | A1 * | 1/2022 | Amer | H01F 41/08 |

FOREIGN PATENT DOCUMENTS

| | | | |
|---|---|---|---|
| CN | 108735458 | A | 11/2018 |
| CN | 111512545 | A | 8/2020 |
| CN | 215955034 | U | 3/2022 |
| DE | 102018122552 | A1 | 3/2020 |
| JP | H06168831 | A | 6/1994 |
| JP | H06302437 | A | 10/1994 |
| WO | 2006053862 | A1 | 5/2006 |

* cited by examiner

INDUCTOR DEVICE

CROSS-REFERENCE TO RELATED APPLICATION

This application claims priority to China Application Serial Number 202210574752.3, filed May 24, 2022, which is herein incorporated by reference in its entirety.

BACKGROUND

Field of Invention

The present invention relates to an indictor device.

Description of Related Art

An inductor is an electrical component. When the current flowing through the inductor is changing, the electromotive force is generated to oppose the current change.

Nowadays, the inductors have been widely applied to many electrical products. For instance, the inductors have been used in smart phones, uninterrupted power supply and PV inverter. There are kinds of inductors, and most of them are made of winding wires. For enterprises, the manufacturing process of winding wires requires much time and manpower, which lead to excessive cost and waste of time.

Therefore, research in various industries has been focused on ways to develop an inductor which is easily manufactured for decreasing the production cost and time and replacing the traditional winding process.

SUMMARY

The present invention relates to an inductor device including a hollow magnetic core and at least one winding assembly. The winding assembly includes a plurality of conductive structures and U-shaped conductors, and the conductive structures are below the hollow magnetic core. The conductive structures are arranged along a segment of the hollow magnetic core, and the U-shaped conductors are across the hollow magnetic core and arranged along the segment of the hollow magnetic core. Two ends of at least one of the U-shaped conductor are respectively in contact with two of the conductive structures such that the U-shaped conductors and the conductive structures are electrically connected to each other and collectively continuously surround the segment of the hollow magnetic core.

In some embodiments of the present invention, the inductor device further includes a carrier board, and the conductive structures are on the carrier board.

In some embodiments of the present invention, the conductive structures are U-shaped, and each of the conductive structures has two ends inserted into the carrier board.

In some embodiments of the present invention, the conductive structures are on a first surface of the carrier board, and each of the conductive structure has a first foot portion, a middle portion and a second foot portion. The middle portion is connected between the first foot portion and the second foot portion, and each of the first and second foot portions has two opposite ends. An extending direction from an end of the first foot portion to another end of the first foot portion is in a first axial direction, and an extending direction from an end of the second foot portion to another end of the second foot portion is in the first axial direction, the first axial direction is parallel to the first surface of the carrier board. The middle portion has two opposite ends, and an extending direction from an end of the middle portion to another end of the middle portion is parallel to the first surface of the carrier board, the extending direction from the end of the middle portion to the another end of the middle portion is not parallel to the first axial direction.

In some embodiments of the present invention, the first foot portion and the second foot portion are spaced apart in the first axial direction, and the first foot portion and the second foot portion are spaced apart in a second axial direction. The second axial direction is parallel to the first surface, and the first axial direction is vertical to the second axial direction.

Another aspect of the present invention relates to an inductor device having a carrier board, a hollow magnetic core and at least one winding assembly, and the hollow magnetic core is on a first surface of the carrier board. The winding assembly has a plurality of U-shaped conductors and a plurality of conductive foils, and the conductive foils are on the carrier board. The U-shaped conductors are on the first surface of the carrier board, and the U-shaped conductors are arranged along a segment of the hollow magnetic core and across the hollow magnetic core. The U-shaped conductors are respectively in electrical contact with the conductive foils such that the U-shaped conductors are electrically connected to form a conductive path continuously surrounding the segment of the hollow magnetic core.

In some embodiments of the present invention, each of the conductive foils includes a head portion, a middle portion and a tail portion, and the middle portion is connected between the head portion and the tail portion. Each of the head portion and the tail portion has two opposite ends, and an extending direction from an end of the head portion to another end of the head portion is in a first axial direction, an extending direction from an end of the tail portion to another end of the tail portion is in the first axial direction. The first axial direction is parallel to the first surface of the carrier board, and the middle portion has two opposite ends. An extending direction from an end of the middle portion to another end of the middle portion is parallel to the first surface of the carrier board, and the extending direction from the end of the middle portion to the another end of the middle portion is not parallel to the first axial direction.

In some embodiments of the present invention, the head portion and the tail portion are spaced apart in the first axial direction, and the head portion and the tail portion are spaced apart in the second axial direction. The second axial direction is parallel to the first surface of the carrier board, and the first axial direction is vertical to the second axial direction.

In some embodiments of the present invention, the inductor further includes a carrier board, and the U-shaped conductors are inserted into through holes of the carrier board.

Another aspect of the present invention relates to an inductor device having a hollow magnetic core and at least one winding assembly, and the winding assembly has a plurality of U-shaped circuit boards and a plurality of conductive foils. The U-shaped circuit boards are arranged along a segment of the hollow magnetic core and across the hollow magnetic core, and the U-shaped circuit boards are respectively in electrical contact with the conductive foils such that the U-shaped circuit boards are electrically connected to form a conductive path continuously surrounding the segment of the hollow magnetic core.

In some embodiments of the present invention, the inductor device has a carrier board, and the hollow magnetic core is on a first surface of the carrier board. The conductive foils are on the carrier board, and the U-shaped circuit boards are on the first surface of the carrier board.

In some embodiments of the present invention, each of the conductive foils includes a head portion, a middle portion and a tail portion, and the middle portion is connected between the head portion and the tail portion. Each of the head portion and the tail portion has two opposite ends, and an extending direction from an end of the head portion to another end of the head portion is in a first axial direction, an extending direction from an end of the tail portion to another end of the tail portion is in the first axial direction. The first axial direction is parallel to the first surface of the carrier board, and the middle portion has two opposite ends. An extending direction from an end of the middle portion to another end of the middle portion is parallel to the first surface of the carrier board, and the extending direction from the end of the middle portion to the another end of the middle portion is not parallel to the first axial direction.

In some embodiments of the present invention, the head portion and the tail portion are spaced apart in the first axial direction, and the head portion and the tail portion are spaced apart in the second axial direction. The second axial direction is parallel to the first surface of the carrier board, and the first axial direction is vertical to the second axial direction.

In some embodiments of the present invention, the U-shaped circuit boards are inserted into through holes of the carrier board.

In summary, the inductor device in the present invention can be assembled and manufactured by easily inserting the U-shaped circuit boards and/or the U-shaped metal conductors into the through holes of the carrier board, and the U-shaped circuit boards or U-shaped metal conductors can replace the traditional assembly method of coil winding and improve the method for manufacturing the inductor device. By the configuration of the conductive structures or the conductive foils, the U-shaped circuit boards or the metal conductors of the winding assembly form a conductive path surrounding the hollow magnetic, so as to manufacture the inductor device with outstanding inductance and high impedance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
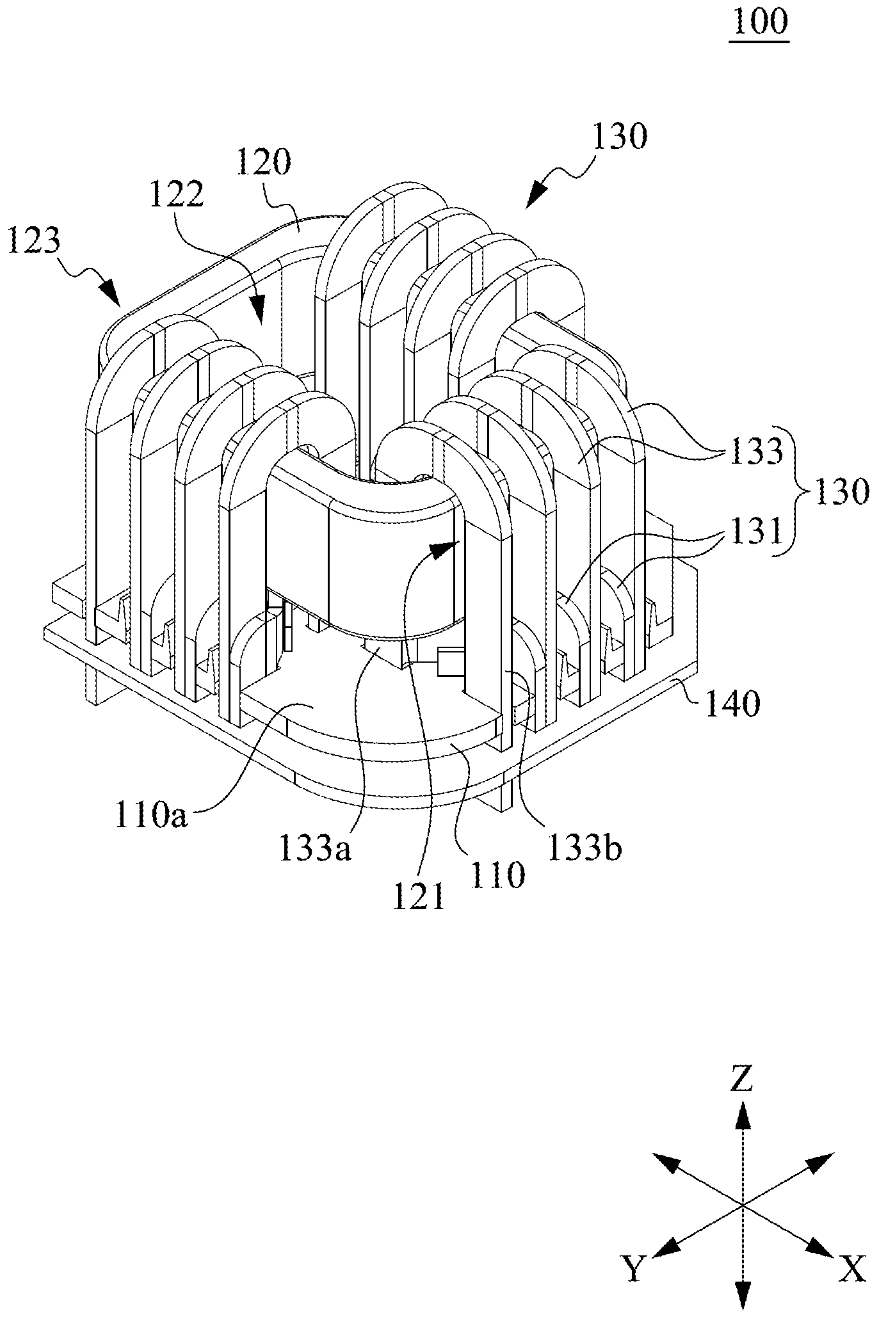
FIG. 1 illustrates a schematic view of an inductor device in some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Reference is made from FIGS. 1-5. In some embodiments of the present invention, an inductor device 100 includes a carrier board 110, a hollow magnetic 120 and a least one winding assembly 130. The hollow magnetic 120 is located on a first surface 110*a* of the carrier board 110, and the hollow magnetic 120 is ring-shaped. The winding assembly 130 includes a plurality of conductive structures 131 and a plurality of U-shaped conductors 133, and the conductive structures 131 are disposed on the first surface 110*a* of the carrier board 110 and below the hollow magnetic 120. The conductive structures 131 are arranged along a section 121 of the hollow magnetic 120, and the U-shaped conductors 133 are disposed above and across the hollow magnetic 120, the U-shaped conductors 133 are arranged along the section 121 of the hollow magnetic 120. Moreover, the conductive structures 131 and the U-shaped conductors 133 are alternately arranged along the section 121 of the hollow magnetic 120, and one or more of the U-shaped conductors 133 has two ends respectively in electrical contact with two of the conductive structures 131 such that the conductive structures 131 and the U-shaped conductors 133 are electrically connected for collectively continuously surrounding the section 121 of the hollow magnetic 120. By Inserting the U-shaped conductors 133 into the carrier board 110, the inductor device 100 of the present invention can be easily assembled, and thus the inductor device 100 with outstanding inductance and high impedance can be easily manufactured and assembled. In addition, a first axial direction X, a second axial direction Y and a third axial direction Z are used for explaining the spatial relationship, and the first axial direction X is vertical to the second axial direction Y, the first axial direction X and the second axial direction Y are vertical to the third axial direction Z.

Specifically, the inductor device 100 is a common mode choke, and the carrier board 110 is a rectangular dielectric board with outstanding rigidity and has the first surface 110*a* extending along a plane direction defined by the first axial direction X and the second axial direction Y. For instance, the first surface 110*a* is a top surface of the carrier board 110 and is the largest surface of the carrier board 110. The first axial direction X and the second axial direction Y are both parallel to the first surface 110*a* of the carrier board 110, and the carrier board 110 is made of an insulation material. The carrier board 110 can include a bakelite board, a glass fiber board or other plastic boards, and the present invention is not limited in this respect. In addition, the hollow magnetic 120 is a ring-shaped structure which extends to surround the third axial direction Z and made of a magnetic material with high magnetic permeability, and the hollow magnetic 120 can be ring-shaped, ellipse-ring-shaped, square-ring-shaped, rectangle-ring-shaped or polygon-ring-shaped. Specifically, the hollow magnetic 120 can include a ceramic core, a ferrite magnet, a magnetic power core or a ferrite magnet core, and the present invention is not limited in this respect.

In some embodiments of the present invention, the conductive structures 131 and the U-shaped conductors 133 can be made of a metal material such as gold, silver, copper, aluminum, and alloy thereof. Each conductive structure 131 is a U-shaped continuous piece of material, and two ends of each conductive structure 131 are inserted into the carrier board 110. Specifically, each conductive structure 131 includes a first foot portion 132*a*, a second foot portion 132*b* and a middle portion 132*c*, and the middle portion 132*c* is connected between the first foot portion 132*a* and the second foot portion 132*b*, the first foot portion 132*a* and the second foot portion 132*b* are flat plates that have the largest surfaces extending along a plane direction defined by the first axial direction X and the third axial direction Z (refer to FIG. 2). A respective one of the first foot portion 132*a* and the second foot portion 132*b* has two opposite ends, and an extending direction from an end 132*a*1 of the first foot portion 132*a* to another end 132*a*2 of the first foot portion 132*a* is in the first axial direction X, an extending direction from an end 132*b*1 of the second foot portion 132*b* to another end 132*b*2 of the second foot portion 132*b* is in the first axial direction X. In addition, the middle portion 132*c* has a long axis (such as longest axis) extending vertically to or obliquely to the first axial direction X, and the middle portion 132*c* has two opposite ends, an extending direction from an end 132*c*1 of the middle portion 132*c* to another end 132*c*2 of the middle portion 132*c* is inclined to or not parallel to the first axial direction X. In addition, the first foot portion 132*a* and the second foot portion 132*b* are spaced apart by a distance in the first axial direction X, and the first foot portion 132*a* and the second foot portion 132*b* are spaced apart by a distance in the second axial direction Y. The section 121 of the hollow magnetic 120 is disposed on the middle portions 132*c* of the conductive structures 131 and in direct contact with the middle portions 132*c* of the conductive structures 131. Therefore, the conductive structures 131 and the U-shaped conductors 133 collectively continuously surround the section 121 of the hollow magnetic 120, so as to manufacture the inductor device 100 with outstanding inductance and high impedance.

Specifically, the first foot portions 133*a* of the U-shaped conductors 133 are located at an inner side 122 of the hollow magnetic 120, and the first foot portions 133*a* of the U-shaped conductors 133 are spaced apart and aligned with each other along the second axial direction Y. Moreover, the second foot portions 133*b* of the U-shaped conductors 133 are located at an outer side 123 of the hollow magnetic 120, and the second foot portions 133*b* of the U-shaped conductors 133 are spaced apart and aligned with each other along the second axial direction Y. In addition, the first foot portions 133*a* and the second foot portions 133*b* of the U-shaped conductors 133 are flat plates that have the largest surfaces extending along a plane direction defined by the first axial direction X and the third axial direction Z, and the first foot portion 133*a* and the second foot portion 133*b* are aligned along the first axial direction X (refer to FIG. 2). When the conductive structures 131 and the U-shaped conductors 133 are assembled to the carrier board 110, the first foot portions 132*a* of the conductive structures 131 are respectively in electrical contact with the first foot portion 133*a* of the U-shaped conductor 133, and the second foot portions 132*b* of the conductive structures 131 are respectively in electrical contact the second foot portion 133*b* of another U-shaped conductor 133. Therefore, the conductive structures 131 and the U-shaped conductors 133 of the winding assembly 130 form a conductive path that continuously surrounds the section 121 of the hollow magnetic 120, so as to manufacture the inductor device 100 with outstanding inductance and high impedance.

Figure 5:
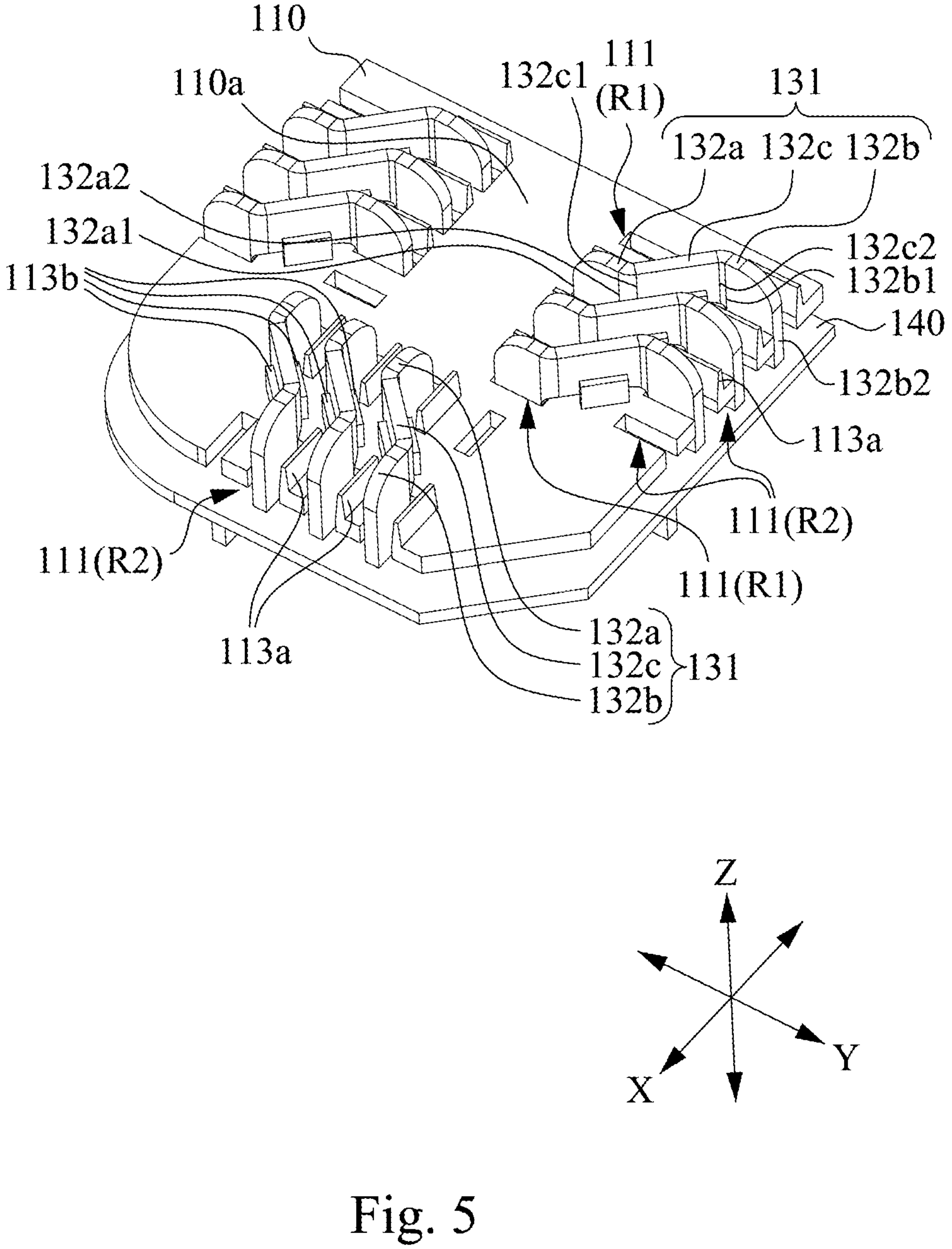
FIG. 5 illustrates a schematic view of the inductor device in FIG. 1, and some parts of the inductor device are neglected.
Figure 6:
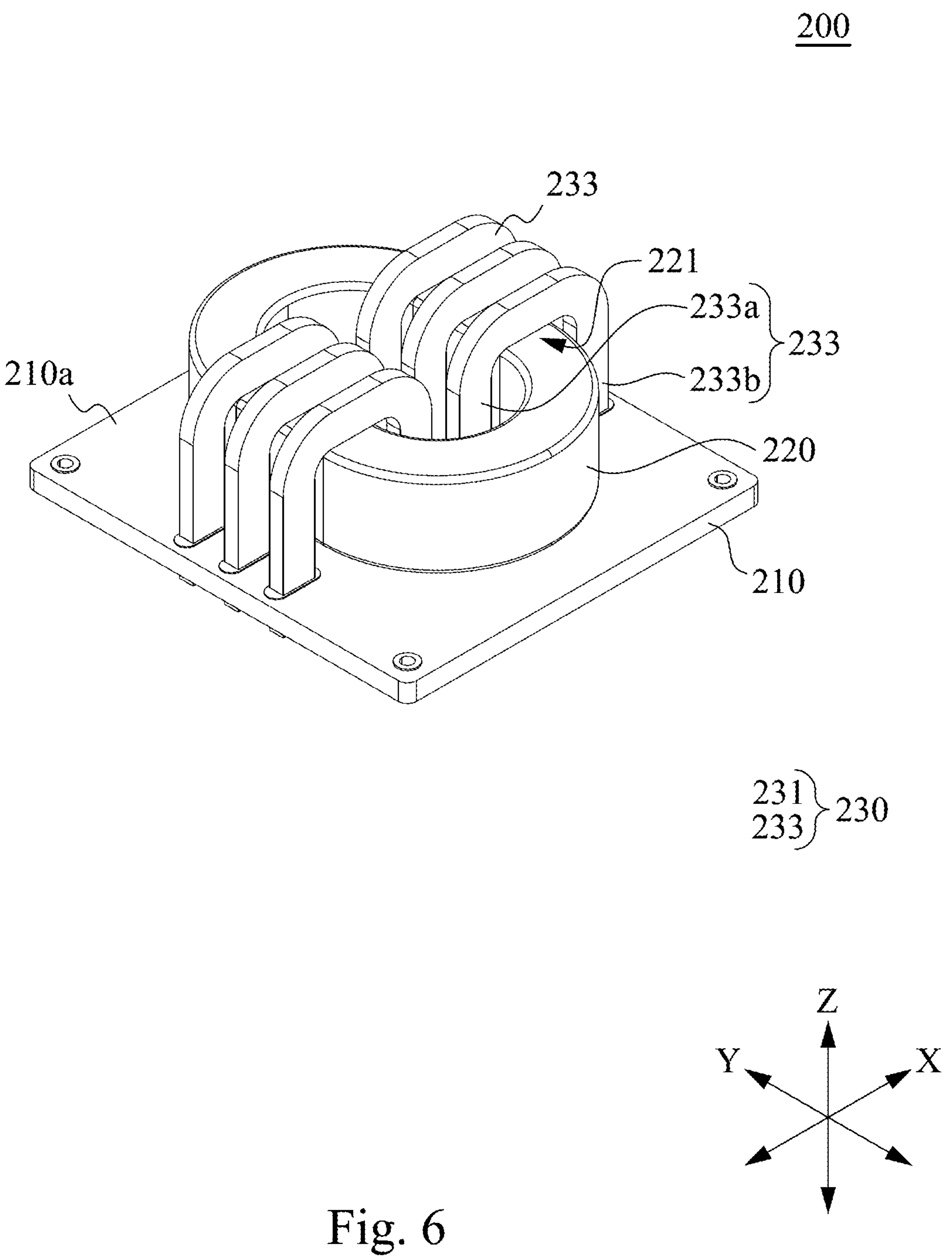
FIG. 6 illustrates a schematic view of an inductor device in some embodiments of the present invention.
Figure 7:
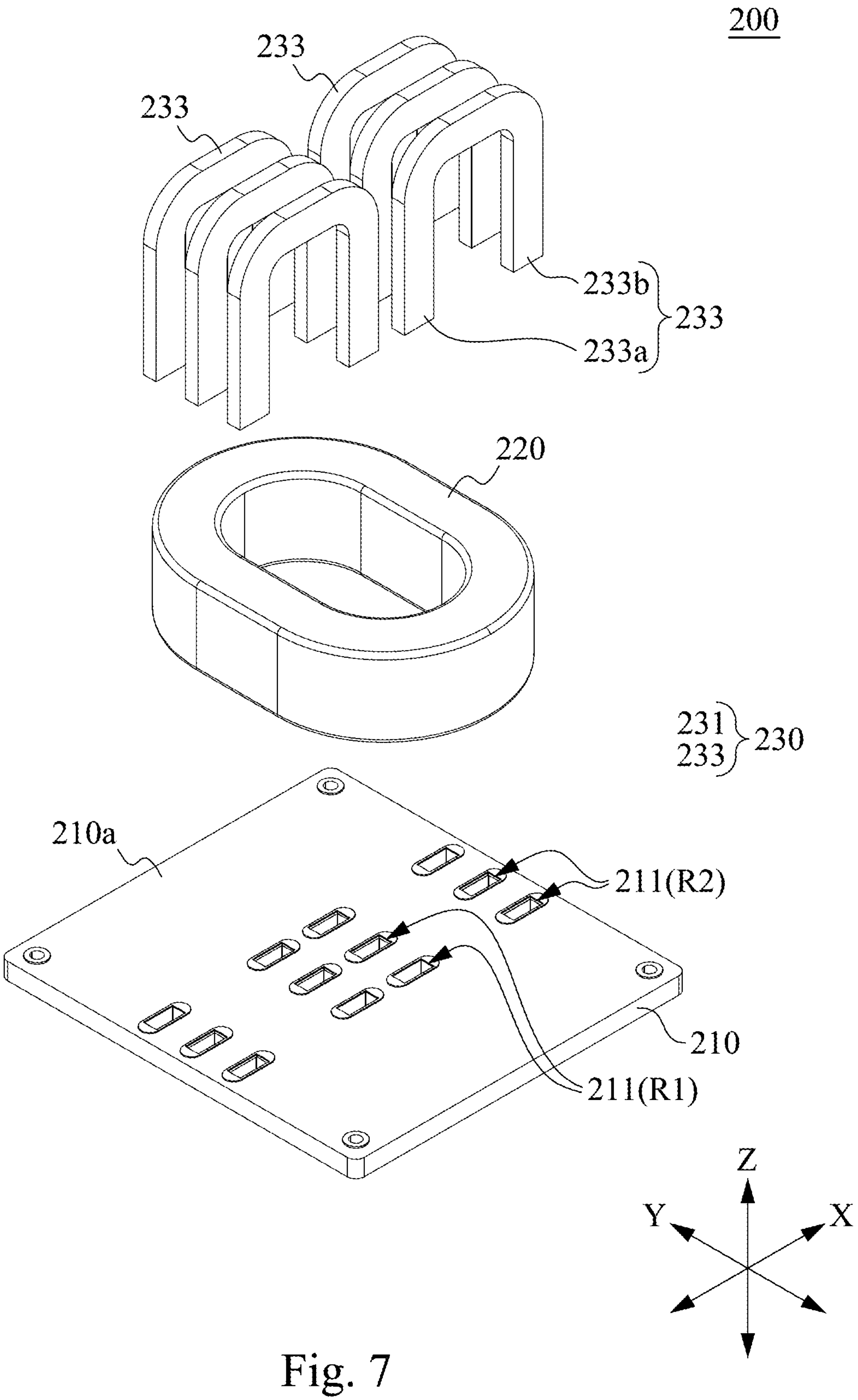
FIG. 7 illustrates an exploded view of the inductor device in FIG. 6.
Figure 8:
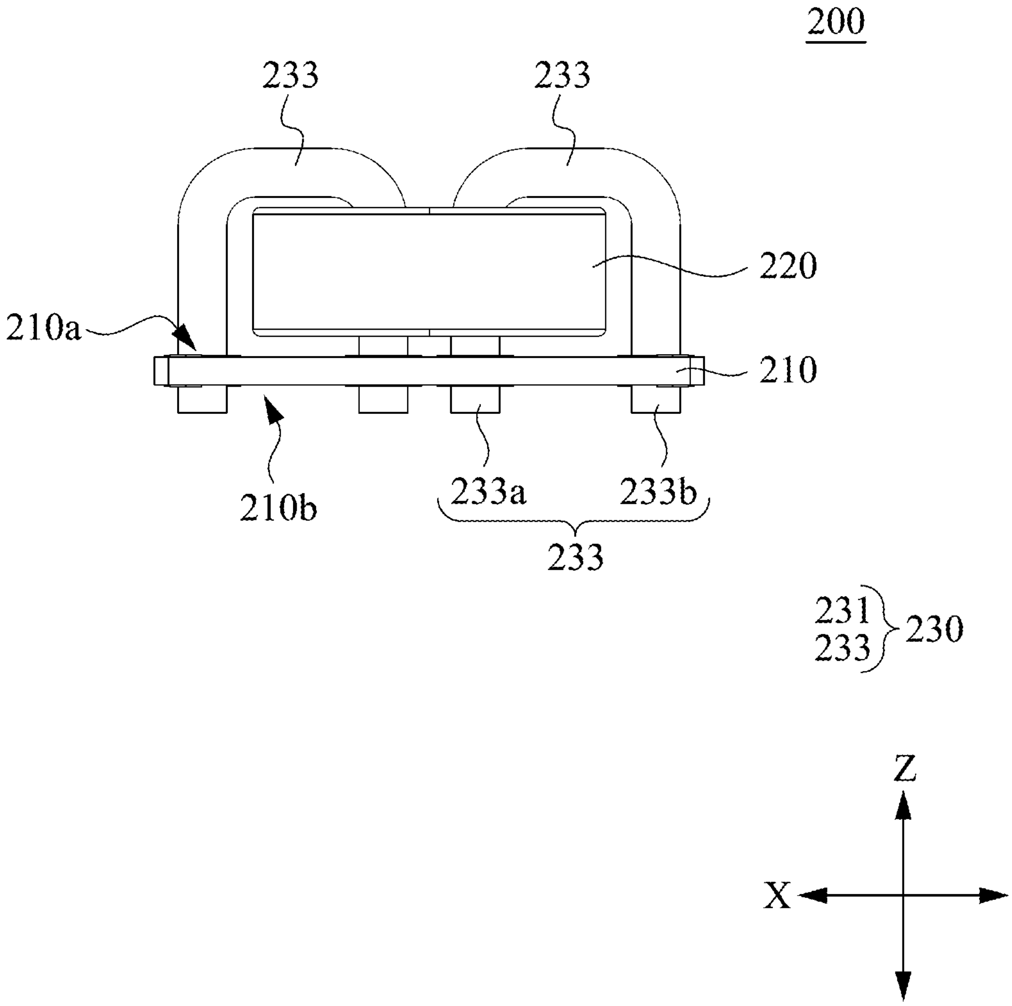
FIG. 8 illustrates a front view of the inductor device in FIG. 6.
Figure 9:
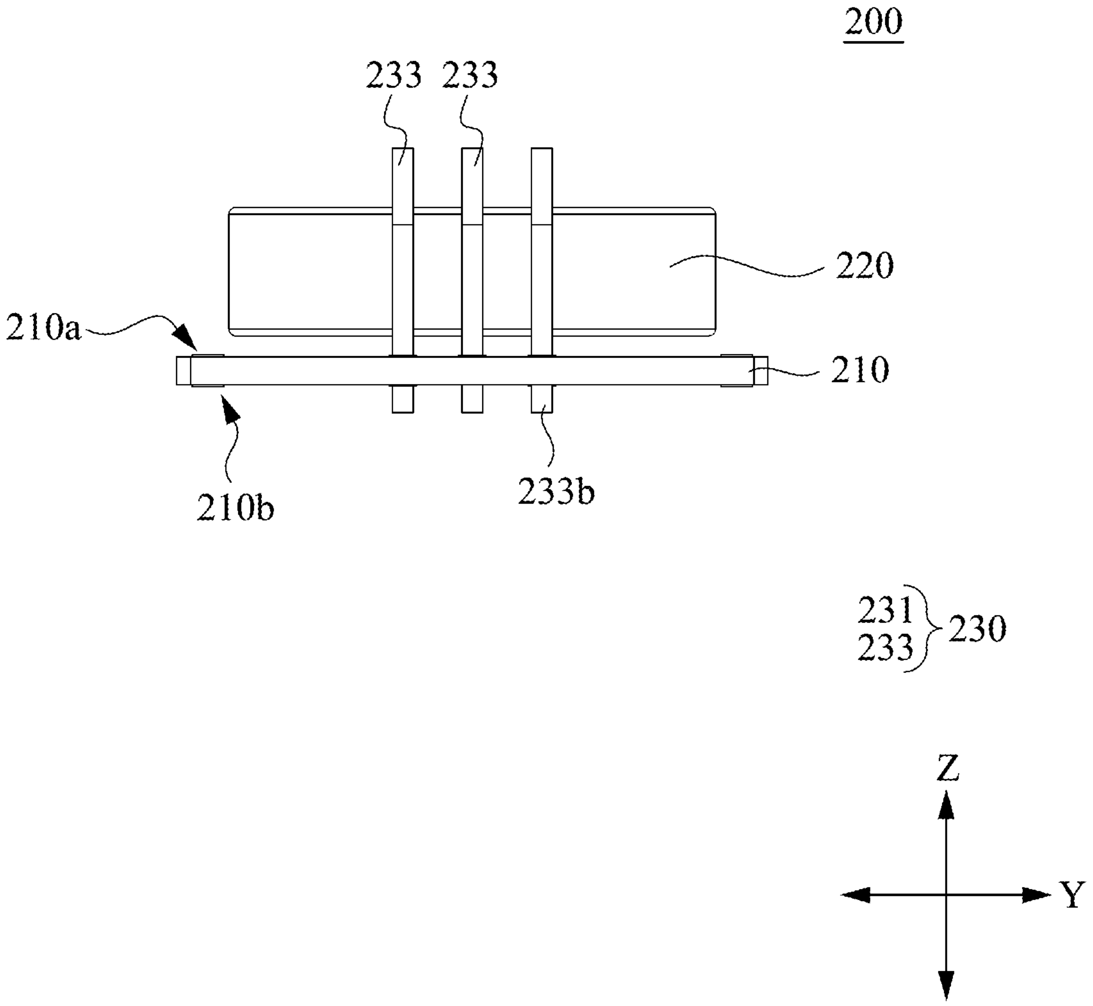
FIG. 9 illustrates a side view of the inductor device in FIG. 6.

In some embodiments of the present invention, the first foot portion 132*a* and the second foot portion 132*b* are flat plates that have largest surfaces extending along a plane direction defined by the second axial direction Y and the third axial direction Z (refer to FIG. 5). Therefore, a respective one of the first foot portion 132*a* and the second foot portion 132*b* has two opposite ends, and an extending direction from an end 132*a*1 of the first foot portion 132*a* to another end 132*a*2 of the first foot portion 132*a* is in the second axial direction Y. An extending direction from an end 132*b*1 of the second foot portion 132*b* to another end 132*b*2 of the second foot portion 132*b* is in the second axial direction Y. Moreover, the middle portion 132*c* has a long axis such as longest axis extending vertically to the second axial direction Y or obliquely to the second axial direction Y, and the middle portion 132*c* has two opposite ends. An extending direction from an end 132*c*1 of the middle portion 132*c* to another end 132*c*2 of the middle portion 132*c* is inclined to or not parallel to the second axial direction Y. The first foot portion 132*a* and the second foot portion 132*b* are spaced apart in the first axial direction X by a distance, and the first foot portion 132*a* and the second foot portion 132*b* are spaced apart in the second axial direction Y by a distance. In addition, the first foot portion 133*a* and the second foot portion 133*b* of the U-shaped conductor 133 are flat plates that have largest surfaces extending along the second axial direction Y and the third axial direction Z, and the first foot portion 133*a* and the second foot portion 133*b* of the U-shaped conductor 133 are overlapped in the second axial direction Y. The first foot portions 132*a* of the conductive structures 131 is in electrical contact with the first foot portion 133*a* the U-shaped conductor 133, and the second foot portion 132*b* of the conductive structure 131 is in electrical contact with the second foot portion 133*b* of another U-shaped conductors 133. As such, the winding assembly 130 can surround the hollow magnetic 120 along the first axial direction X, so as to form the inductor device 100 with outstanding inductance and high impedance.

Figure 2:
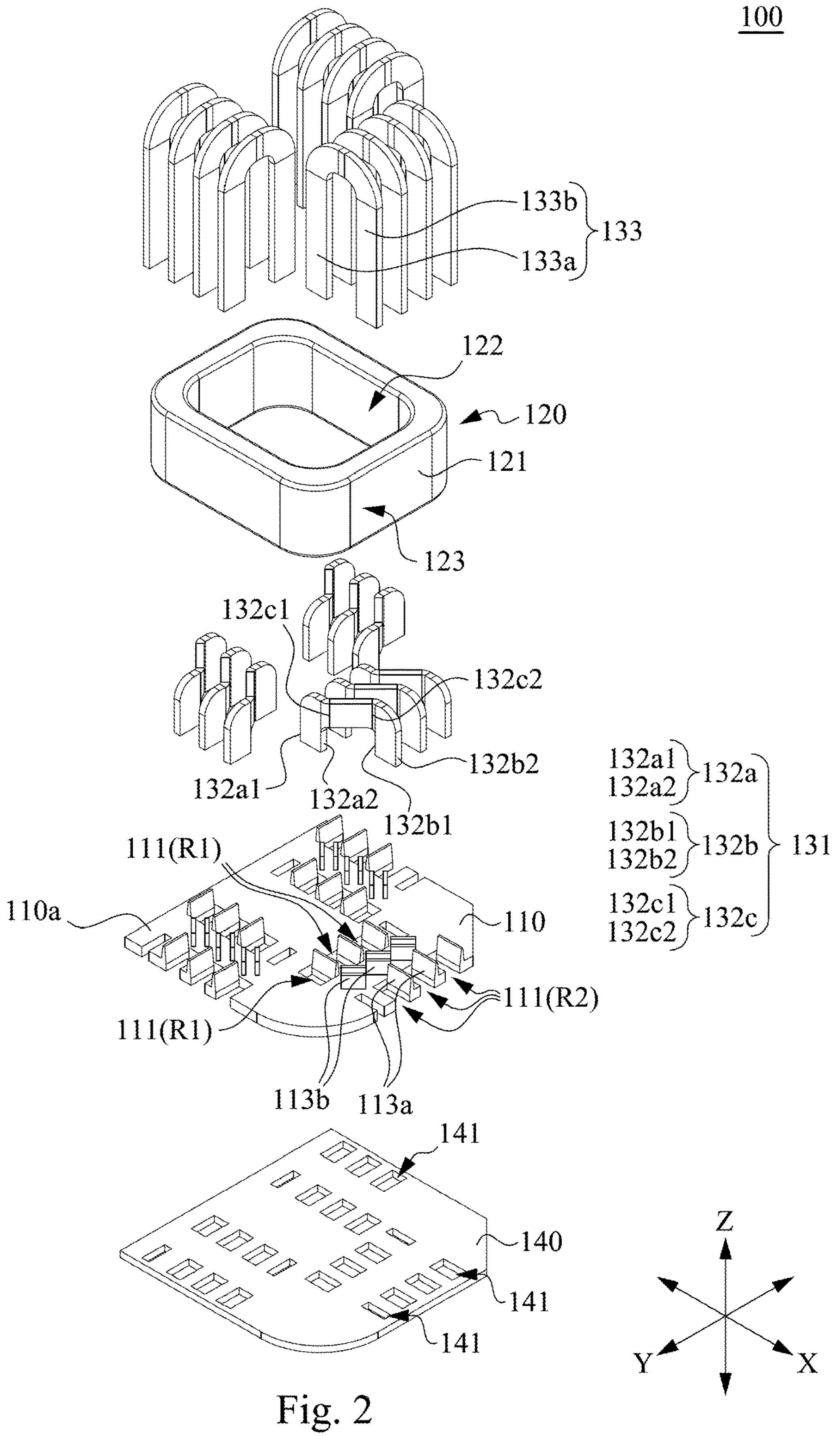
FIG. 2 illustrates an exploded view of the inductor device in FIG. 1.
Figure 3:
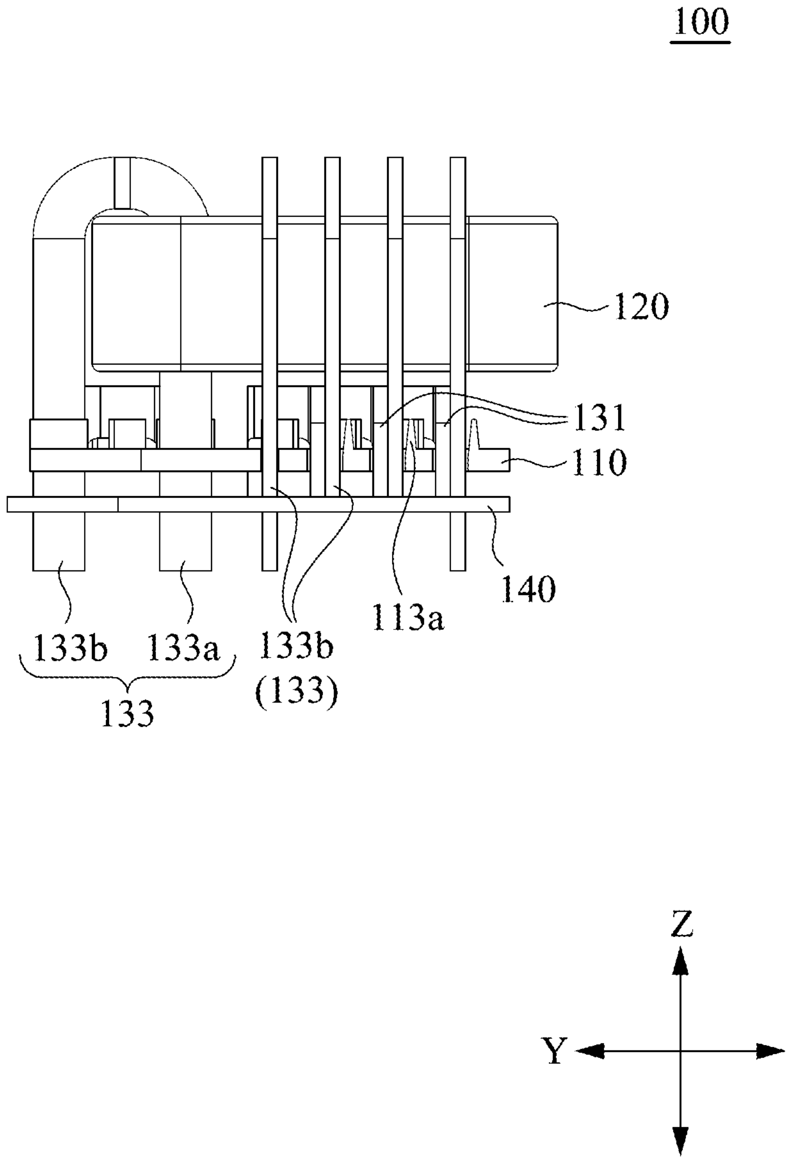
FIG. 3 illustrates a side view of the inductor device in FIG. 1.
Figure 4:
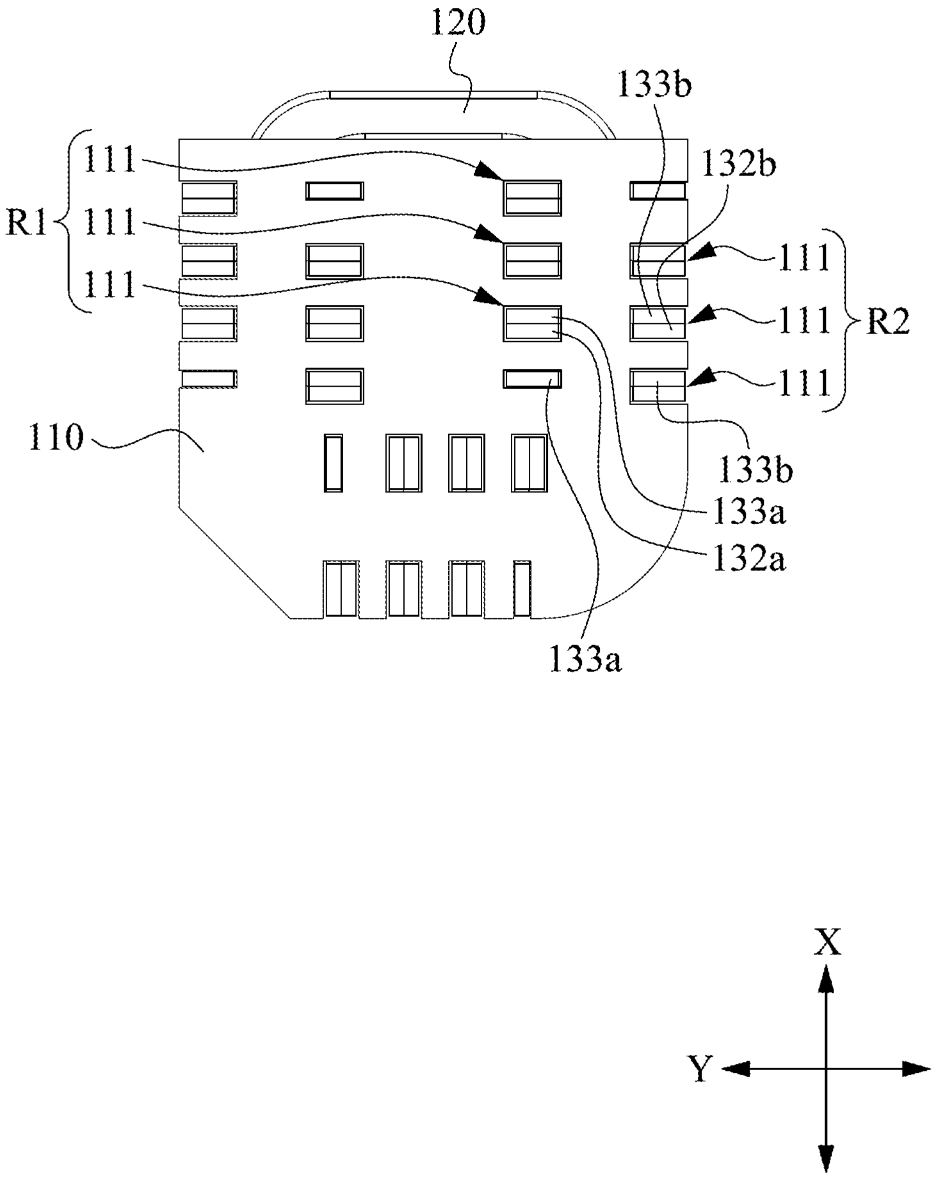
FIG. 4 illustrates a bottom view of the inductor device in FIG. 1, and a supporting board of the inductor device is neglected.

In some embodiments of the present invention, as shown in FIG. 2, the carrier board 110 has a plurality of rectangular first through holes 111, and the first through holes 111 are arranged in two rows (a first row R1 and a second row R2) along the second axial direction Y. The first through holes 111 of the first row R1 are spaced apart along the second axial direction Y, and the second row R2 are spaced apart along the second axial direction Y. The first through holes 111 of the first row R1 are respectively aligned with the first through holes 111 of the second row R2 along the first axial direction X. In addition, the first foot portion 132*a* of each conductive structure 131 and/or the first foot portion 133*a* of each U-shaped conductor 133 are inserted into a respective one of the first through holes 111 of the first row R1, and the second foot portion 132*b* of each conductive structure 131 and/or the second foot portion 133*b* of each U-shaped conductor 133 are inserted into a respective one of the first through holes 111 of the second row R2. As such, the conductive structures 131 and the U-shaped conductors 133 of the winding assembly 130 form a conductive path surrounding the hollow magnetic 120, so as to form the inductor device 100 with outstanding inductance and high impedance. In some embodiments of the present invention, as shown in FIG. 4, the first through holes 111 are arranged in two rows (the first row R1 and the second row R2) along the first axial direction X, and the first through holes 111 of the first row R1 are spaced apart in the first axial direction X, and the first through holes 111 of the second row R2 are spaced apart along the first axial direction X. The first through holes 111 of the first row R1 are aligned with the first through holes 111 of the second row R2 along the second axial direction Y, and the first through holes 111 can be assembled to the winding assembly 130 in a different direction.

In some embodiments of the present invention, as shown in FIGS. 2 and 5, the carrier board 110 includes a plurality of first walls 113*a* and a plurality of second walls 113*b*, and the first walls 113*a* are respectively located between adjacent two of the first through holes 111 of the second row R2, the first walls 113*a* extend from the first surface 110*a* of the carrier board 110 in the third axial direction Z to protrude upward. Each of the first walls 113*a* has two opposite ends extending in a direction parallel to the first axial direction X, and the first walls 113*a* are disposed adjacent to the conductive structures 131 and the U-shaped conductors 133 for supporting. In addition, the second walls 113*b* are respectively located between the first through holes 111 of the first row R1 and the first through holes 111 of the second row R2, and the second walls 113*b* extend from the first surface 110*a* of the carrier board 110 in the third axial direction Z to protrude upward. Each of the second walls 113*b* has two opposite ends extending in a direction inclined to or not parallel to the first axial direction X and the second axial direction Y, and adjacent two of the second walls 113*b* are parallel to each other for supporting the middle portion 132*c* of the conductive structures 131. Moreover, the first wall 113*a* between two of the first through holes 111 of the first row R1 supports the first foot portion 132*a* of the conductive structure 131 and the first foot portion 133*a* of the U-shaped conductor 133. The first wall 113*a* between two of the first through holes 111 of the second row R2 supports the second foot portion 132*b* of the conductive structure 131 and the second foot portion 133*b* of the U-shaped conductor 133. As such, when the conductive structures 131 and the U-shaped conductors 133 are assembled to the carrier board 110, the carrier board 110 can stably fix and support the conductive structures 131 and the U-shaped conductors 133 via the first walls 113*a* and the second walls 113*b*, thereby improving the overall structural strength of the inductor device 100. In the present embodiment, the carrier board 110 is a circuit board, and the present invention is not limited in this respect.

In some embodiments of the present invention, the inductor device 100 further includes a supporting board 140 located below the carrier board 110, and the conductive structures 131 and the U-shaped conductors 133 are all inserted into the carrier board 110 and the supporting board 140. The supporting board 140 includes a plurality of second through holes 141 arranged relative to the first through holes 111. When the conductive structures 131 and the U-shaped conductors 133 are inserted into the carrier board 110 and the supporting board 140, the first through holes 111 are respectively aligned with the second through holes 141 along the third axial direction Z. The carrier board 110 and the supporting board 140 both provide supporting abilities to the inductor device 100 for improving the overall structural strength of the inductor device 100.

Reference is made to FIGS. 6-10. In some embodiments of the present invention, an inductor device 200 includes a carrier board 210, a hollow magnetic 220 and one or more winding assembly 230, and the hollow magnetic 220 is located above the first surface 210*a* of the carrier board 210 (such as top surface of the carrier board 210). The winding assembly 230 includes a plurality of conductive foils 231 (referring to FIG. 10) and a plurality of U-shaped conductors 233, and the conductive foils 231 are located on the carrier board 210. The U-shaped conductors 233 are located on the first surface 210*a* of the carrier board 210, and the U-shaped conductors 233 are parallel to each other and arranged along a section 221 of the hollow magnetic 220. The U-shaped conductors 233 are across the hollow magnetic 220, so the hollow magnetic 220 is locate between the conductive foils 231 and the U-shaped conductors 233. The U-shaped conductors 233 are respectively in electrical contact with the conductive foils 231, and the conductive foils 231 and the U-shaped conductors 233 are alternately arranged along the section 221 of the hollow magnetic 220 such that the conductive foils 231 and the U-shaped conductors 233 are electrically connected to form a conductive path continuously surrounding the section 221 of the hollow magnetic 220. That is, one or more of the U-shaped conductors 233 has two ends respectively in electrical contact with two of the conductive foils 23, so as to form a conductive path continuously surrounding the hollow magnetic 220. The U-shaped conductors 233 can be easily assembled to the carrier board 210 to manufacture the inductor device 200, so the U-shaped conductors 233 can replace the traditional assembly method of coil windings. Therefore, the inductor device 200 with outstanding capacitance and high impedance in the present invention can be easily assembled.

Specifically, the inductor device 200 is a common mode choke, and the carrier board 210 can be a printed wiring board, and the carrier board 210 is made of an insulation material. For instance, the carrier board 210 is made of backlite, epoxy or glass fiber, and the present invention is not limited in this respect. The hollow magnetic 120 and the hollow magnetic 220 are substantially the same, so the description regarding the hollow magnetic 220 is not repeated. In some embodiments, the conductive foils 231 and the U-shaped conductors 233 can be made of a metal material such as gold, silver, copper, aluminum and alloy thereof, and each of the conductive foils 231 and the U-shaped conductors 233 can be a continuous piece of material. The present invention is not limited in this respect. In some embodiments, the carrier board 210 can include a circuit board, and the conductive foils 231 are copper foils applied to the circuit board for wiring arrangement, and the present invention is not limited in this respect.

Figure 10:
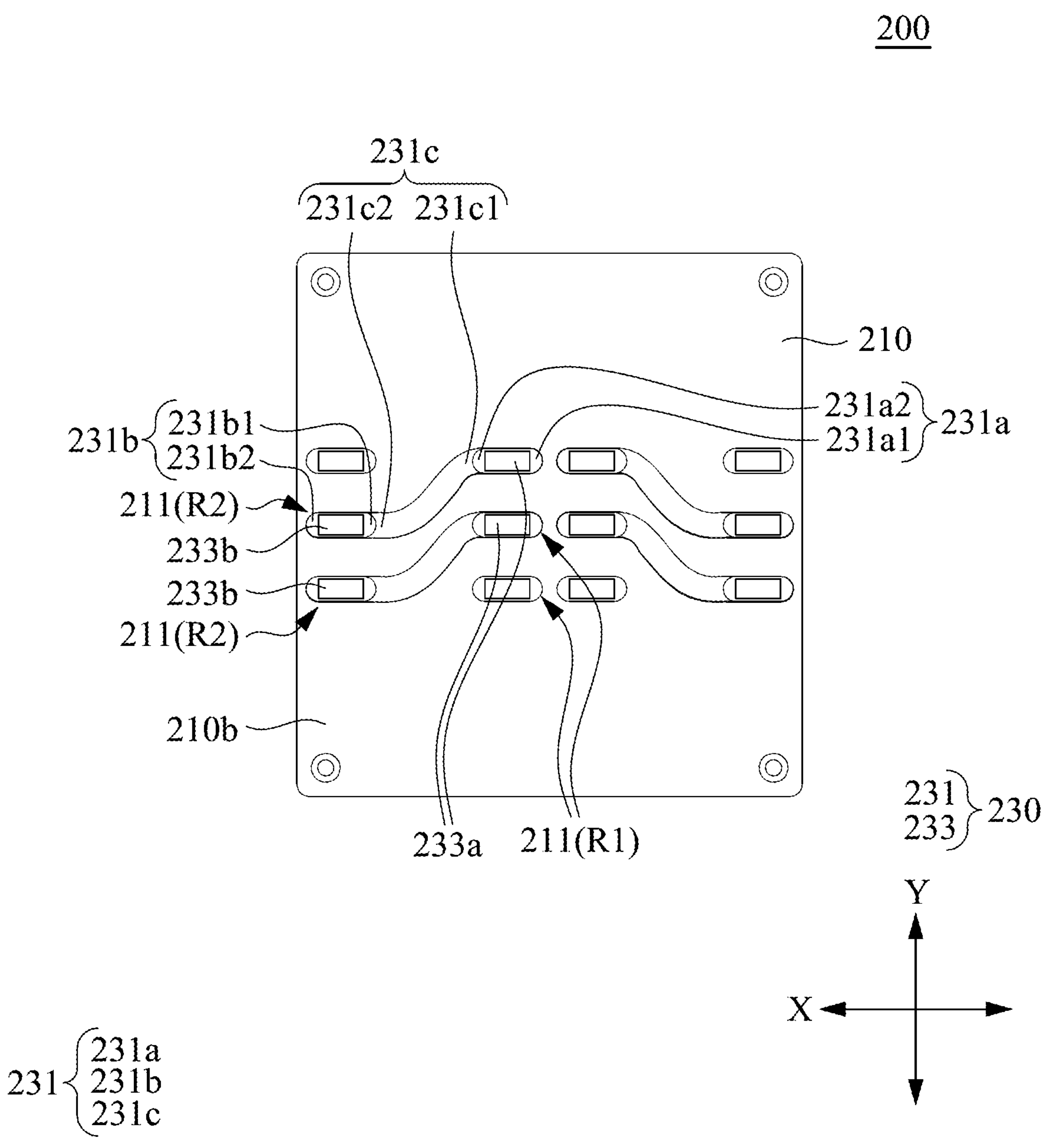
FIG. 10 illustrates a bottom view of the inductor device in FIG. 6.
Figure 11:
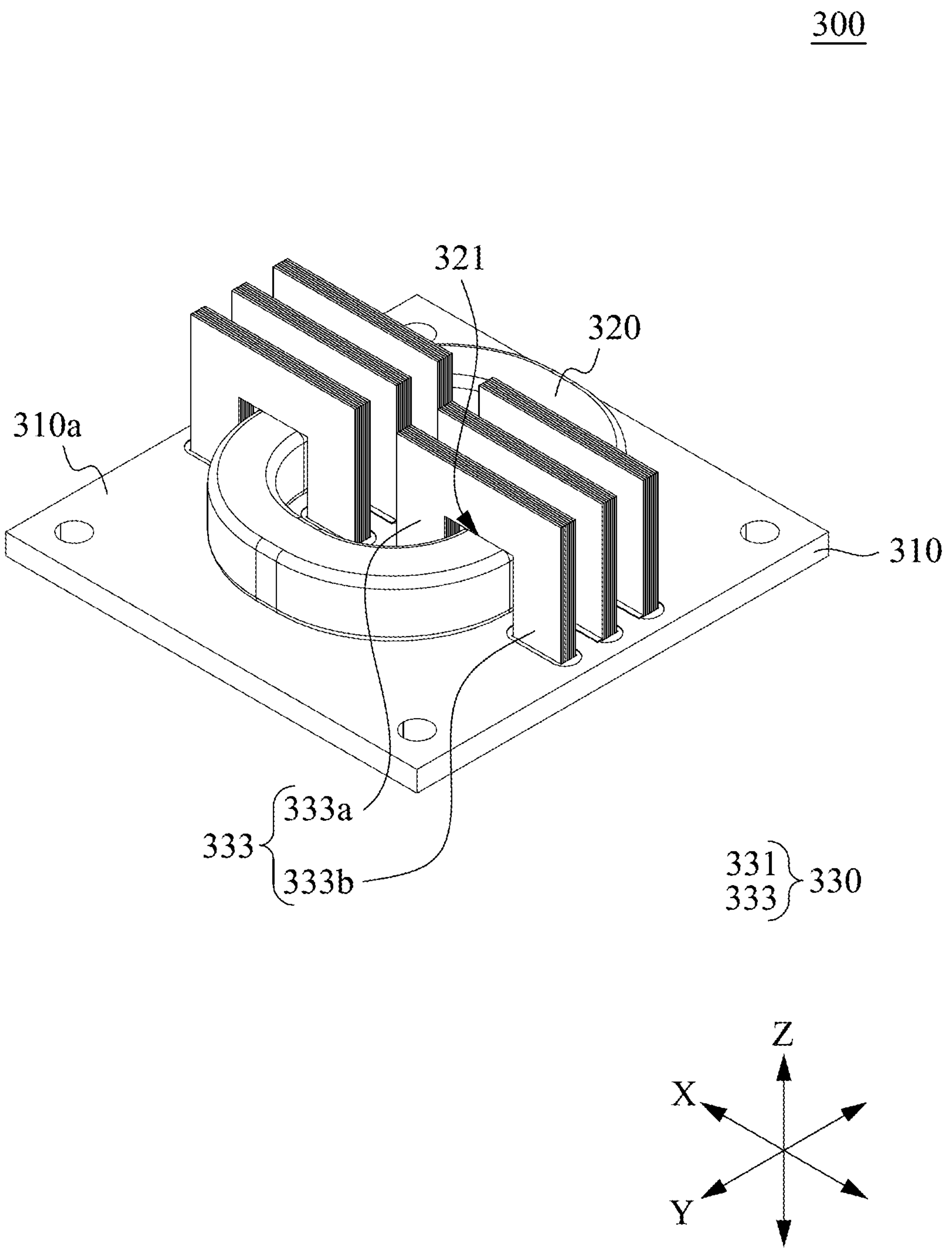
FIG. 11 illustrates a schematic view of an inductor device in some embodiments of the present invention.

In some embodiments of the present invention, as shown in FIG. 10, the conductive foils 231 are located at a second surface 210*b* of the carrier board 210 such as bottom surface, and each of the conductive foils 231 includes a head portion 231*a*, a tail portion 231*b* and a middle portion 231*c*, and the middle portion 231*c* is connected between the head portion 231*a* and the tail portion 231*b*. Each of the head portion 231*a* and the tail portion 231*b* has two opposite ends 231*a*1 and 231*a*2, and an extending direction from an end 231*a*1 of the head portion 231*a* to another end 231*a*2 of the head portion 231*a* is in the first axial direction X, an extending direction from an end 231*b*1 of the tail portion 231*b* to another end 231*b*2 of the tail portion 231*b* is in the first axial direction X. The first axial direction X is parallel to the first surface 210*a* and the second surface 210*b* of the carrier board 210, so a long axis of the head portion 231*a* and a long axis of the tail portion 231*b* both substantially extend along the first axial direction X. In addition, the middle portion 231*c* also has two opposite ends 231*c*1 and 231*c*2, and an extending direction from an end 231*c*1 of the middle portion 231*c* to another end 231*c*2 of the middle portion 231*c* is inclined to or not parallel to the first axial direction X. The middle portion 231*c* has a long axis extending substantially obliquely to or vertically to the first axial direction X, so the head portion 231*a* and the tail portion 231*b* are spaced apart by a distance in the first axial direction X, and the head portion 231*a* and the tail portion 231*b* are spaced apart by a distance in the second axial direction Y, and the second axial direction Y is parallel to both the first surface 210*a* and the second surface 210*b* of the carrier board 210. The first foot portion 233*a* of the U-shaped conductor 233 is in electrical contact with the head portion 231*a* of the conductive foil 231, and the second foot portion 233*b* of the U-shaped conductor 233 is in electrical contact with the tail portion 231*b* of another conductive foil 231. Specifically, the first foot portion 233*a* and the second foot portion 233*b* of the U-shaped conductor 233 are flat plates that extend along a plane direction defined by the first axial direction X and the third axial direction Z, so as to be inserted into and fixed to the carrier board 210. As such, the winding assembly 230 continuously surrounds the hollow magnetic 220 to form the inductor device 200 with outstanding inductance and high impedance.

In some embodiments of the present invention, the carrier board 210 has a plurality of rectangular through holes 211, and the through holes 211 are arranged in a first row R1 and a second row R2 along the second axial direction Y, the through holes 211 of the first row R1 are spaced apart from each other along the second axial direction Y. The through holes 211 of the second row R2 are spaced apart from each other along the second axial direction Y, and the through holes 211 of the first row R1 are respectively aligned with the through holes 211 of the second row R2 in the first axial direction X. The first foot portions 233*a* of the U-shaped conductors 233 are respectively inserted into the through holes 211 of the first row R1 to fix the first foot portion 233*a* of the U-shaped conductors 233. The second foot portions 233*b* of the U-shaped conductors 233 are respectively inserted into the through holes 211 of the second row R2 to fix the second foot portions 233*b* of the U-shaped conductors 233. As such, the U-shaped conductors 233 can be easily inserted into the through holes 211 and respectively in electrical contact with the conductive foils 231 such that the conductive foils 231 and the U-shaped conductors 233 of the winding assembly 230 collectively form a conductive path surrounding the hollow magnetic 220, so as to manufacture the inductor device 200 with outstanding inductance and high impedance.

Reference is made to FIGS. 11-15. In some embodiments of the present invention, an inductor device 300 includes a carrier board 310, a hollow magnetic 320 and a least one winding assembly 330. The hollow magnetic 320 is located on the first surface 310*a* of the carrier board 310, and the winding assembly 330 includes a plurality of conductive foils 331 and a plurality of U-shaped circuit boards 333. The conductive foils 331 are located on the carrier board 310, and the U-shaped circuit boards 333 are located on the first surface 310*a* of the carrier board 310. The U-shaped circuit boards 333 are arranged along a section 321 of the hollow magnetic 320 and across the hollow magnetic 320, and thus the hollow magnetic 320 is disposed between the conductive foils 331 and the U-shaped circuit boards 333. The U-shaped circuit boards 333 are respectively electrically connected to the conductive foils 331 on the carrier board 310, and the conductive foils 331 and the U-shaped circuit boards 333 are alternately arranged along the section 321 of the hollow magnetic 320 such that the U-shaped circuit boards 333 are electrically connected to from a conductive path continuously surrounding the section 321 of the hollow magnetic 320. Therefore, two ends of one or more of the U-shaped circuit boards 333 are respectively in electrical contact with two of the conductive foils 331, so as to form a conductive path continuously surrounding the hollow magnetic 320. Since the U-shaped circuit boards 333 can be easily inserted into the carrier board 310 to manufacture the inductor device 300 in the present invention, the U-shaped circuit boards 333 can replace the traditional assembly method of coil windings for manufacturing the inductor device 300 with outstanding capacitance and high impedance.

Specifically, the inductor device 300 is a common mode choke, and the carrier board 310 can be a printed wiring board, and the carrier board 310 is made of an insulation material. For instance, the carrier board 310 is made of backlite, epoxy or glass fiber, and the present invention is not limited in this respect. The aforementioned hollow magnetic 120 and the hollow magnetic 320 are substantially the same, and the description regarding the hollow magnetic 320 is not repeated. Each of the conductive foils 331 can be a continuous piece of metal material such as gold, silver, copper, aluminum, and alloy thereof. In addition, the U-shaped circuit board 333 can be a printed circuit board with a single layer or multiple layers, and the U-shaped circuit board 333 can have insulation layers and metal layers which are alternately stacked, outer layers of the U-shaped circuit boards 333 are metal layers for being in electrical contact with the conductive foils 331 conveniently. When the U-shaped circuit boards 333 have multi-metal layers, the multi-metal layers are electrically connected, in which each insulation layer is between two metal layers, and the present invention is not limited in this respect. Specifically, the first foot portion 333*a* and the second foot portion 333*b* of the U-shaped circuit board 333 are flat plates that extend along the first axial direction X and the third axial direction Z, so as to be inserted into and fixed to the carrier board 310. In some embodiments, the carrier board 310 is a circuit board, and the conductive foils 331 are copper foils applied to the circuit board for wiring arrangement, the present invention is not limited in this respect.

Figure 12:
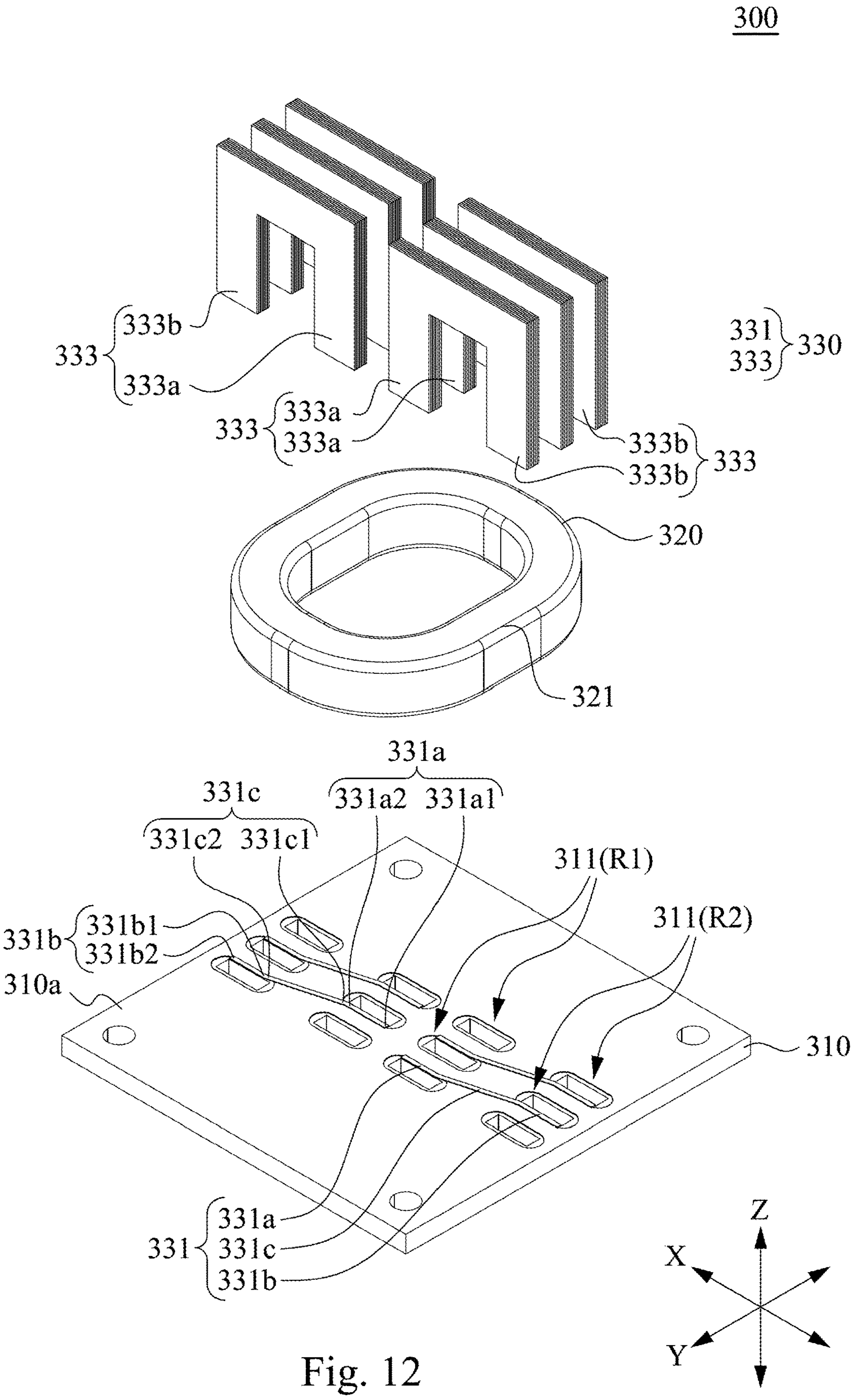
FIG. 12 illustrates an exploded view of the inductor device in FIG. 11.
Figure 13:
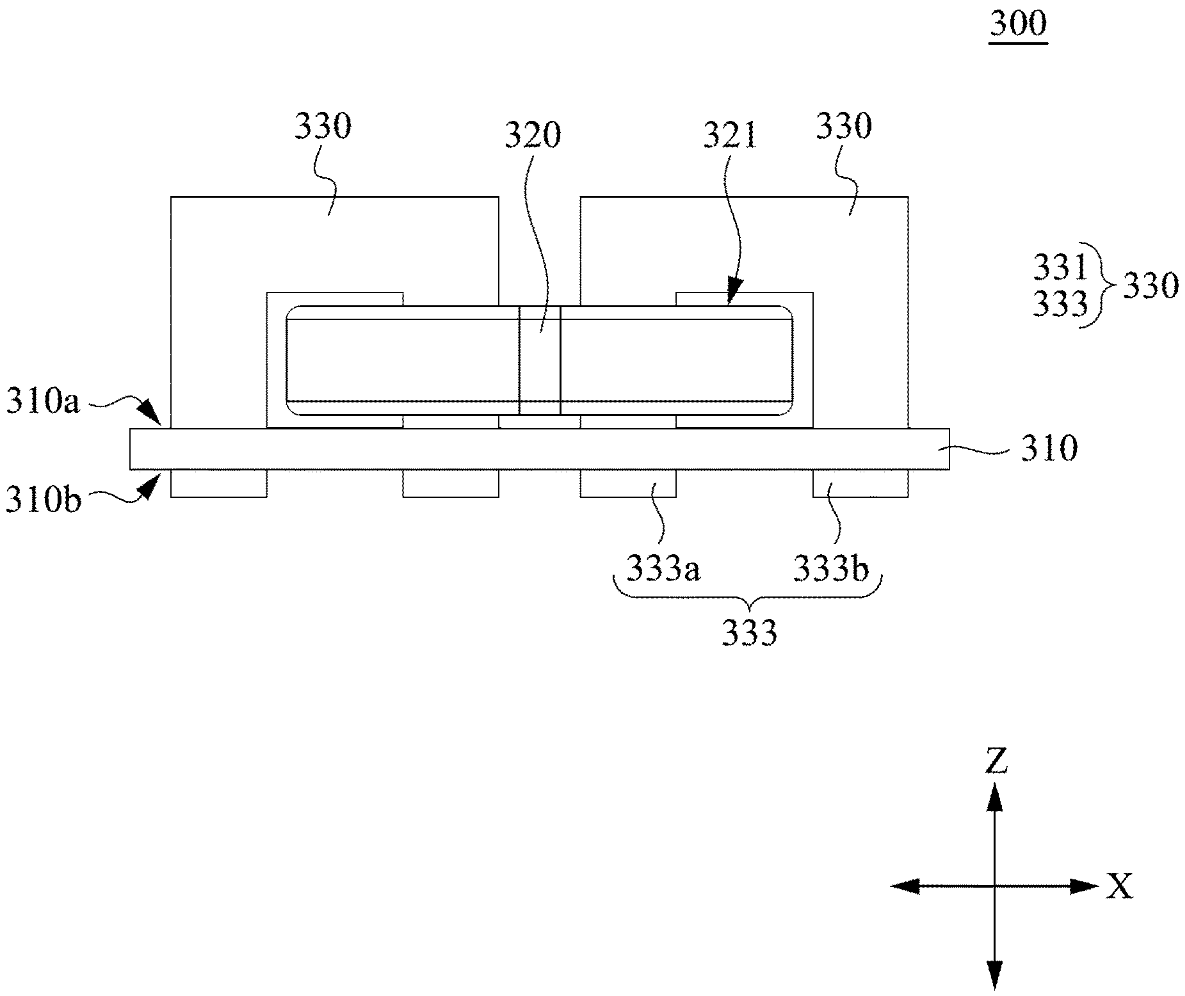
FIG. 13 illustrates a front view of the inductor device in FIG. 11.
Figure 14:
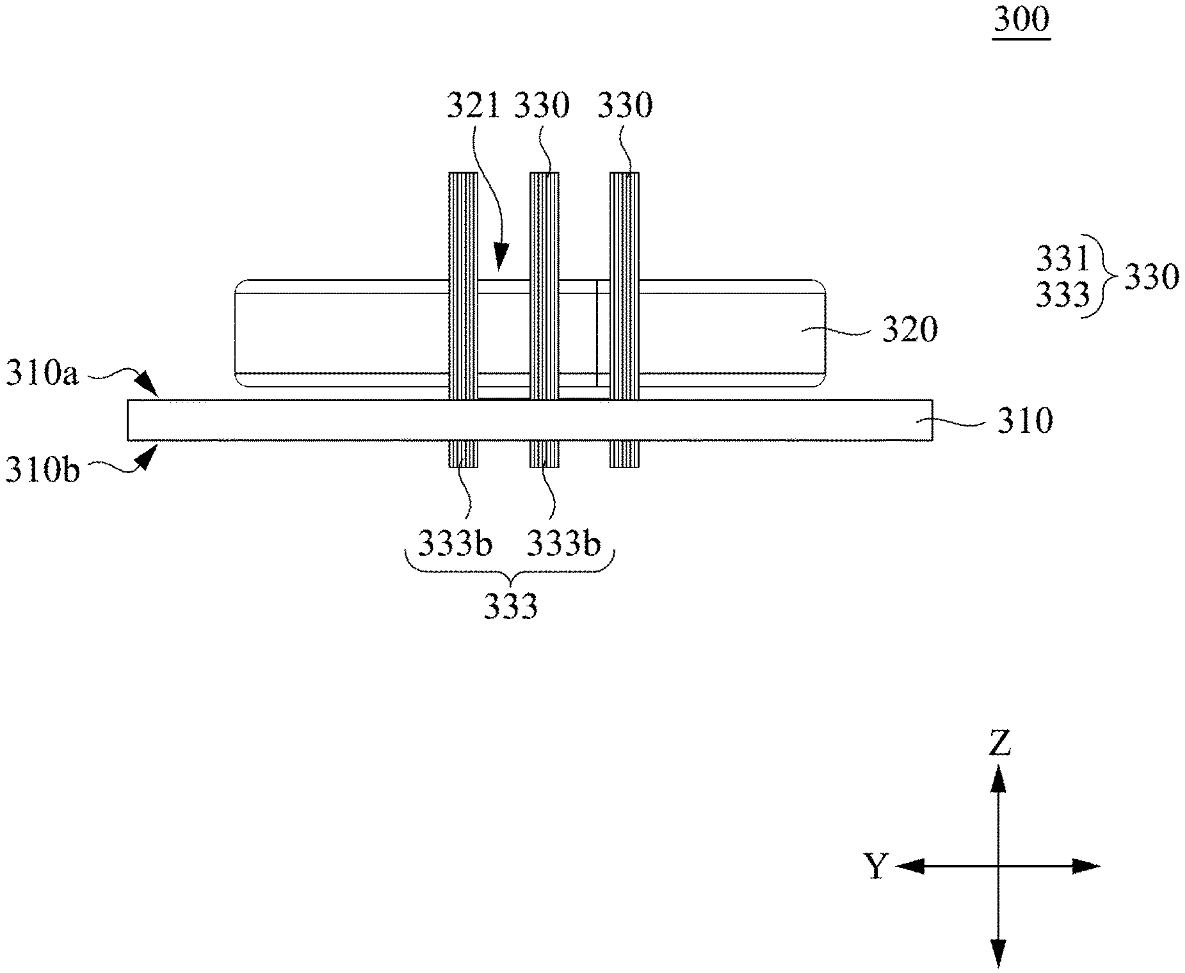
FIG. 14 illustrates a side view of the inductor device in FIG. 11.
Figure 15:
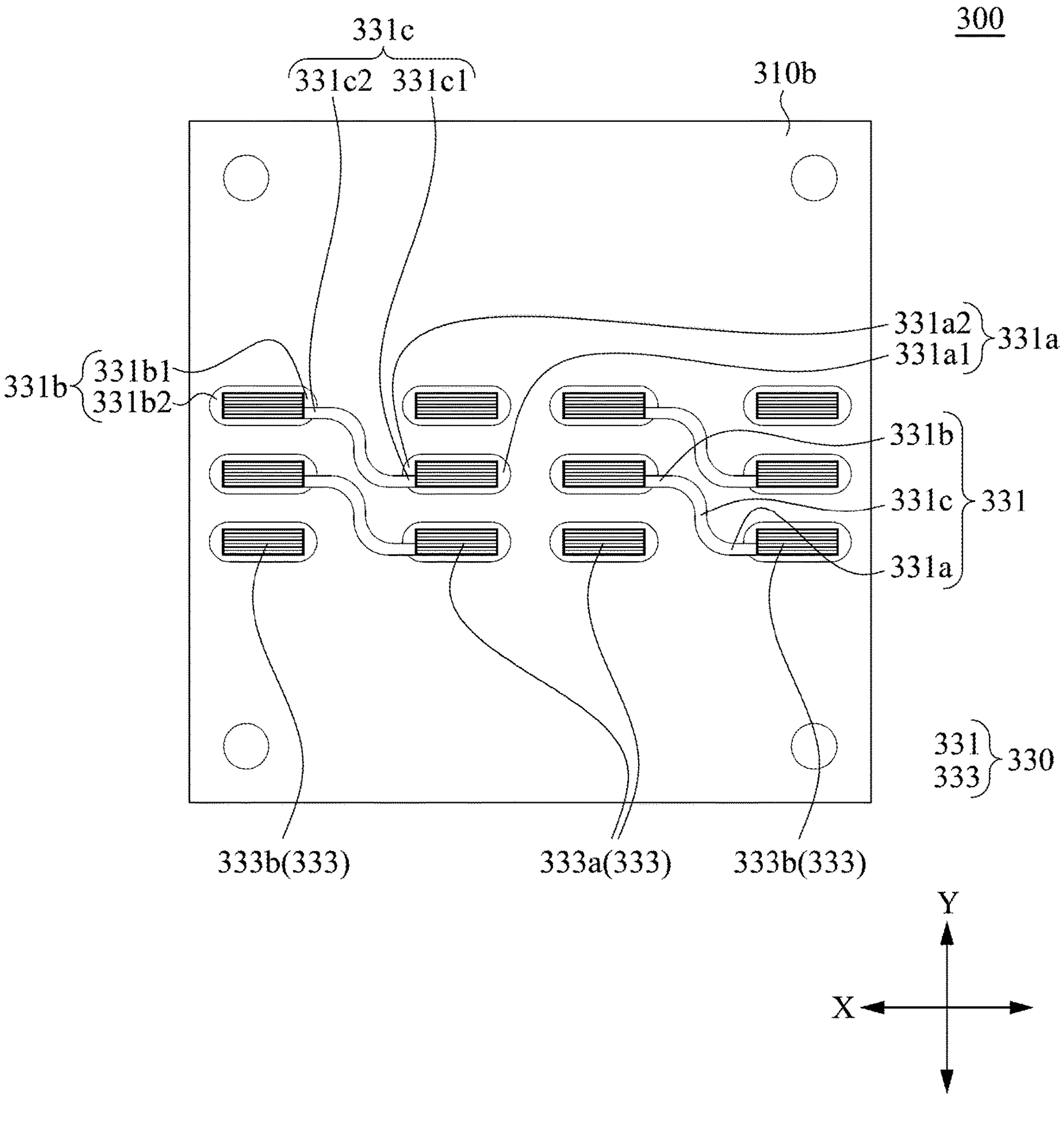
FIG. 15 illustrates a bottom view of the inductor device in FIG. 11.

In some embodiments of the present invention, the conductive foils 331 are located on the first surface 310*a* of the carrier board 310 such as the top surface shown in FIG. 12 and/or the second surface 310*b* such as the bottom surface shown in FIG. 15. Each of the conductive foils 331 includes a head portion 331*a*, a tail portion 331*b* and a middle portion 331*c*, and the middle portion 331*c* is connected between the head portion 331*a* and the tail portion 331*b*. Each of the head portion 331*a* and the tail portion 331*b* has two opposite ends 331*a*1 and 331*a*2, and an extending direction from an end 331*a*1 of the head portion 331*a* to another end 331*a*2 of the head portion 331*a* is in the first axial direction X, an extending direction from an end 331*b*1 of the tail portion 331*b* to another end 331*b*2 of the tail portion 331*b* is in the first axial direction X. The first axial direction X is parallel to the first surface 310*a* and the second surface 310*b*, so a long axis of the head portion 331*a* and a long axis of the tail portion 331*b* substantially extend along the first axial direction X. In addition, the middle portion 331*c* also has two opposite ends 331c1 and 331c2, and an and extending direction from an end 331c1 of the middle portion 331c to another end 331c2 of the middle portion 331c is not parallel to the first axial direction X, the middle portion 331c has a long axis extending obliquely to or vertically to the first axial direction X. The head portion 331a and the tail portion 331b are spaced apart by a distance in the first axial direction X, and the head portion 331a and the tail portion 331b are spaced apart by a distance in the second axial direction Y, the second axial direction Y is parallel to the first surface 310a and the second surface 310b of the carrier board 310. The first foot portion 333a of the U-shaped circuit board 333 is in electrical contact with the head portion 331a of the conductive foil 331, and the second foot portion 333b of the U-shaped circuit boards 333 is in electrical contact with the tail portion 331b of another conductive foil 331. As such, the winding assembly 330 can continuously surround the hollow magnetic 320 to manufacture the inductor device 300 with outstanding inductance and high impedance.

In some embodiments of the present invention, the carrier board 310 has a plurality of rectangular through holes 311, and the through holes 311 are arranged in a first row R1 and a second row R2 along the second axial direction Y. The through holes 311 of the first row R1 are spaced apart from each other along the second axial direction Y, and the through holes 311 of the second row R2 are spaced apart from each other along the second axial direction Y, the through holes 311 of the first row R1 are respectively aligned with the through holes 311 of the second row R2 along the first axial direction X. Moreover, the first foot portions 333a of the U-shaped circuit boards 333 are respectively inserted into the through holes 311 of the first row R1, so as to fix the first foot portions 333a of the U-shaped circuit boards 333. The second foot portions 333b of the U-shaped circuit boards 333 are respectively inserted into the through holes 311 of the second row R2, so as to fix the second foot portions 333b of the U-shaped circuit boards 333. As such, the U-shaped circuit boards 333 can be easily respectively inserted into the through holes 311 to be in electrical contact with the conductive foils 331, and thus the conductive foils 331 and the U-shaped circuit boards 333 of the winding assembly 330 collectively form a conductive path surrounding the hollow magnetic 320, so as to manufacture the inductor device 300 with outstanding inductance and high impedance.

In summary, the inductor device in the present invention can be assembled and manufactured by easily inserting the U-shaped circuit boards and/or the U-shaped metal conductors into the through holes of the carrier board, and the U-shaped circuit boards or U-shaped metal conductors can replace the traditional assembly method of coil winding and improve the method of manufacturing the inductor device. By the configuration of the conductive structures or the conductive foils, the U-shaped circuit boards or the metal conductors of the winding assembly form a conductive path surrounding the hollow magnetic, so as to manufacture the inductor device with outstanding inductance and high impedance.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An inductor device, comprising:

a carrier board having a plurality of through holes;

a plurality of parallel walls protruding upward from the carrier board;

a hollow magnetic core; and a winding assembly having a plurality of conductive structures and a plurality of U-shaped conductors, and the conductive structures are disposed below the hollow magnetic core, each U-shaped conductor is disposed between immediately-adjacent two of the plurality of parallel walls, the conductive structures are arranged along a segment of the hollow magnetic core, and the U-shaped conductors are arranged around and beyond the segment of the hollow magnetic core, wherein two ends of at least one of the U-shaped conductors are inserted into corresponding ones of the through holes respectively in contact with two of the conductive structures such that the U-shaped conductors and the conductive structures are electrically connected to each other and collectively continuously surround the segment of the hollow magnetic core, wherein the conductive structures are U-shaped, and each of the conductive structures has two ends inserted into the carrier board, the plurality of conductive structures and the plurality of U-shaped conductors are on the same side of the carrier board.

2. The inductor device of claim 1, wherein the conductive structures are disposed on a first surface of the carrier board, each of the conductive structures has a first foot portion, a middle portion and a second foot portion, and the middle portion is connected between the first foot portion and the second foot portion, each of the first and second foot portions has two opposite ends, wherein an extending direction from an end of the first foot portion to another end of the first foot portion is in a first axial direction, an extending direction from an end of the second foot portion to another end of the second foot portion is in the first axial direction, and the first axial direction is parallel to the first surface of the carrier board, the middle portion has two opposite ends, wherein an extending direction from an end of the middle portion to another end of the middle portion is parallel to the first surface of the carrier board, the extending direction from the end of the middle portion to the another end of the middle portion is not parallel to the first axial direction.

3. The inductor device of claim 2, wherein the first foot portion and the second foot portion are spaced apart in the first axial direction, the first foot portion and the second foot portion are spaced apart in a second axial direction, and the second axial direction is parallel to the first surface, the first axial direction is vertical to the second axial direction.

4. The inductor device of claim 1, wherein each conductive structure is disposed between immediately-adjacent two of the plurality of parallel walls.

5. The inductor device of claim 1, wherein each U-shaped conductor is sandwiched between a corresponding one of the parallel walls and a corresponding one of the conductive structures.

6. The inductor device of claim 5, wherein each U-shaped conductor is in contact with the corresponding one of the parallel walls and the corresponding one of the conductive structures.

* * * * *